United States Patent [19]
von Widdern et al.

[11] Patent Number: 5,863,643
[45] Date of Patent: Jan. 26, 1999

[54] MULTI-LAYERED PLASTIC CASING WITH TWO ADJACENT LAYERS MADE FROM ALIPHATIC POLYAMIDE

[75] Inventors: Michael Hennig-Cardinal von Widdern, Walsrode; Ulrich Reiners, Neuenkirchen, both of Germany

[73] Assignee: Wolff Walsrode AG, Walsrode, Germany

[21] Appl. No.: 743,930

[22] Filed: Nov. 5, 1996

Related U.S. Application Data

[63] Continuation of Ser. No. 168,593, Dec. 16, 1993, abandoned.

[30] Foreign Application Priority Data

Dec. 23, 1992 [DE] Germany .......................... 42 43 800.4

[51] Int. Cl.⁶ .......................... B32B 27/20; B32B 27/32; B32B 27/34
[52] U.S. Cl. .................. 428/220; 428/474.7; 428/474.9; 428/475.8; 428/476.1; 428/476.3; 428/476.9; 428/477.7
[58] Field of Search .................. 428/34.8, 35.4, 428/36.6, 36.7, 36.9, 36.91, 215, 219, 220, 474.4, 474.7, 474.9, 475.5, 475.8, 476.1, 476.3, 476.9, 477.7

[56] References Cited

U.S. PATENT DOCUMENTS

| | | | |
|---|---|---|---|
| 4,461,808 | 7/1984 | Mollison | 428/475.8 |
| 4,556,696 | 12/1985 | Stenort et al. | 525/432 |
| 4,911,979 | 3/1990 | Nishimoto et al. | 428/332 |
| 5,055,355 | 10/1991 | DeAntonis et al. | 428/476.3 |
| 5,185,189 | 2/1993 | Sterger et al. | 428/34.8 |

FOREIGN PATENT DOCUMENTS

| | | |
|---|---|---|
| B-79299/91 | 1/1992 | Australia . |
| 0277839 | 8/1983 | European Pat. Off. . |
| 0132565 | 2/1985 | European Pat. Off. . |
| 0225164 | 6/1987 | European Pat. Off. . |
| 0277839 | 8/1988 | European Pat. Off. . |
| 0467039 | 1/1992 | European Pat. Off. . |
| 0530439 | 3/1993 | European Pat. Off. . |
| 0530538 | 3/1993 | European Pat. Off. . |

*Primary Examiner*—D. S. Nakarani
*Attorney, Agent, or Firm*—Sprung Kramer Schaefer & Briscoe

[57] ABSTRACT

The invention relates to a coextruded, biaxially stretched, tubular film, with at least two adjacent layers made from aliphatic polyamide, for wrapping goods packaged in liquid or paste form, especially foodstuffs, which are subjected to heat-treatment during and/or after being wrapped, such as for example, various types of German sausage, cheese, butter, etc.

8 Claims, No Drawings

MULTI-LAYERED PLASTIC CASING WITH TWO ADJACENT LAYERS MADE FROM ALIPHATIC POLYAMIDE

This application is a continuation of application Ser. No. 08/168,593, filed on Dec. 16, 1993 which is abandoned.

The invention relates to a coextruded, biaxially stretched tubular film for wrapping goods packed in liquid or paste form, in particular foodstuffs which are subject to heat treatment during and/or after wrapping, such as e.g. various kinds of German sausage, cheese, butter, etc.

BACKGROUND OF THE INVENTION

Accompanying the requirements of film users for wrappings that combine a higher barrier effect against water vapour and oxygen permeation but with reduced use of material, also characterised by the recent appearance of tubular films with small diameters of 20 to 150 mm, is the trend towards combining material properties by means of coextruding different polymers in order to satisfy these demands. In the process, biaxially stretched polyamide/polyolefin composites with wall thicknesses between 35 and 70 $\mu$m are increasingly gaining general acceptance.

The problem with polyamides in this type of film structure even during biaxial stretching using the known "double bubble" technique, is the termination of transverse expansion of the tubes, due to molecular orientation and expansion-induced crystallisation, at degrees of transverse stretching between 2.8 and 4. When the tubular films are used for the specific purpose of, for instance, wrapping sausages, then the mechanical properties of the stretched polyamide, as compared with that of the incompletely stretched polyolefin, dominate.

When modifying this type of PA/PE film composite by admixing organic or inorganic filler additives, especially to the internally or externally located PA layer(s), narrow limits are set with regard to fractional amount and granular size because a polyamide/polymer matrix of this type is weakened if fractional amounts, depending on the specific additive, are exceeded and problems then occur during the production-determining stretching process.

On the other hand, this restriction on amounts when admixing fillers in the past frequently led to wrappings whose mix components were not effective enough such that optimisation of specific film properties could not be fully achieved and detrimental other properties and/or undesirable production difficulties had to be accepted.

Thus, for example, the addition of increased proportions of pigment to an internally or externally located polyamide layer, with the objective of increasing the intensity of colour, led to a number of production engineering difficulties, which were obvious to the user due to reduced product quality and to the manufacturer due to the reduced working life of plant.

Pigment granules, which are located on the surface of the polymer tubes during the stretching process, lead to micro-tears in the surface. These micro-tears are often the reason why stretching film bubbles burst, because they are the starting points for uncontrollable tear propagation.

Deposits of pigment granules are produced on the lips of extrusion dies, especially with high pigment contents in one of the internally or externally located polymer layers. These deposits again produce irregularities in the thickness over the circumference of the primary tube being stretched and thus produce on the one hand increased striations in the film end product and on the other hand production engineering difficulties associated with the biaxial stretching process such that the thinner areas have a different deformation characteristic and this often causes the stretching film bubbles to burst.

Increased pigment granule contents in externally located polymer layers are especially detrimental if additive deposits from the pigment are formed on the transport and squeezing rolls, causing soiling of the plant which is unacceptable in production of food-grade film.

If the highly pigmented layer is located on the internal face of the film tube, there is also the risk that pigments are transferred to the foodstuffs on direct contact of the film with the contents.

The object of the present invention was therefore to enable the production of a wrapping with an increased proportion of filler components in a polyamide (PA) layer, without having to accept disadvantages with respect to the production process, especially biaxial stretching, or the resulting qualitative characteristics of the film.

DESCRIPTION OF THE PRIOR ART

Japanese patent application J 1 014 032 describes a biaxially stretched coextruded tubular film for use as a German sausage wrapper. Whereas the external polymer layer applied to the contents consists of an aliphatic polyamide, the internally located layer which faces the contents is formed from an ethylene/acrylic acid copolymer. The middle layer, which is arranged between the internal and external layers and is made from PE or PP copolymers, is used to promote adhesion of the surrounding layers. This film structure has proven reliable in practical application, with satisfactory barrier properties and strength.

With this type of film it has been generally accepted that only the polyolefin layer acts as a pigment carrier, because weakening of the PA layer due to the addition of a sufficient quantity of dye pigments would make the stretching process difficult to control.

Due to the thinness of the polyolefin layers available to be enriched with dye pigments, ca. 15 to 20 $\mu$m, it is not possible to produce a coloured wrapping with satisfactory pigment covering power and colour effect.

It has been attempted, on occasions, to conceal the inadequate pigment covering power and colour effect of coloured wrappings by colour-printing over the whole area. This additional manufacturing stage, however, is very expensive and raises the manufacturing costs to an unacceptable level.

German patent application DE 40 17 046 describes a coextruded biaxially stretched tubular film with an inner layer which is in contact with the contents and is made from an aliphatic and/or partly aromatic (co)polyamide, a core layer made from an aliphatic copolyamide and a core layer made from a polyolefin and adhesion promoting components.

Even this film design does not allow the desired amounts of organic or inorganic additives to be added to the polyamide layer(s) without weakening the polyamide carrier layers to such an extent that the production-relevant stretching process is disrupted.

A further object of the invention which is described below was therefore to find a film structure with a high proportion of film property modifying additives in one of the polyamide layers, without having to accept disadvantages with respect to the production process, especially biaxial stretching, or to the resulting qualitative characteristics of the film.

SUMMARY OF THE INVENTION

The present invention provides a coextruded, biaxially stretched tubular film having at least 4 layers with an internally and an externally located polyamide layer and a layer with a water vapour blocking function enclosed by the polyamide outer layers, characterised in that at least one further layer made of mainly aliphatic polyamide is present, which is modified by the addition of organic and/or inorganic additives; the further layer is bonded directly to at least one of the internally or externally located polyamide layers.

By bonding a layer made from aliphatic polyamide which is modified by inorganic and/or organic additives to at least one of the internally or externally located polyamide outer layers, a number of the production engineering difficulties and qualitative disadvantages which are dependent on the additives can be avoided.

Surprisingly, the amount of polyamide modifying additives can be greatly increased, while maintaining the desired overall film thickness, without on the other hand having to accept the disadvantages in production engineering or of decrease in quality. Thus, the film producer can now offer the user tailor-made film qualities, via increased additions of modified mix components. From the point of view of film technology, the resulting possibilities of increasing the pigment concentration and of admixing high proportions of plasticising and barrier-improving organic polymer modifiers to the polyamide, are particularly significant.

It is also possible, with the film structure according to the invention, to greatly improve both the water vapour barrier properties and the film elasticity by adding high proportions by weight of partially compatible copolymers based on ethylene or propylene to the encapsulated polyamide layer. Addition of ethylene/vinylalcohol copolymers to the polyamide layer concerned leads to a considerable reduction in the oxygen permeation of the film according to the invention.

Furthermore, the opacity of coloured films can be greatly increased by means of pigments with large pigment granule diameters. Hitherto, large pigment granule geometries in the polyamide layer(s) of multi-layered tubular films have often led to bursting of films prepared by the "double bubble" process. Apart from improving the opacity, the metallic effect may be intensified, particularly by means of colourings which involve metal pigments.

In particular, the addition of pigment granules to the aliphatic polyamide produces an increase in the crystallinity of the polyamide structure of the primary tube being stretched. Again, the increased crystallinity can interfere with the stretching process. For this reason, in a preferred embodiment, the pigmented polyamide layer essentially consists of an aliphatic copolyamide. The crystallisation inhibiting copolymer structure reduces the crystallinity and thus makes the stretching process easier.

Inorganic pigments with a thermal stability of greater than 280° C. are preferably used to colour the polyamides. While normally the particle size of the pigments is ca. 1 $\mu$m, colouring with metallic effects may require the use of particle dimensions up to 25 $\mu$m.

Colouring preferably takes place by the addition of pigment masterbatches to the polyamide.

Examples of suitable inorganic pigments in masterbatches are:
titanium dioxide, carbon black, zinc iron yellow, iron oxide, etc.

Preparation of the biaxially stretched tubular films preferably takes place by the known "double bubble" or by the "injected bubble" process, in which initially the tubular extrudate is converted into the solid state by intensive cooling.

During the next stage of the production process, the relatively thick-walled primary tube (300 to 500 $\mu$m) obtained in this way is re-heated to a temperature which is suitable for stretching the solid. Re-heating may be performed in one or several stages using, for example, hot air, superheated steam, a constant temperature water bath or infra-red radiators.

Biaxial stretching is achieved by using a gaseous or liquid pressure pad or by using a solid. To increase the degree of longitudinal stretch, the power of the pair of take-off rolls can be specifically increased.

In a preferred method of production, a heat-setting stage follows biaxial stretching, in order to improve the dimensional stability of the tubular film by heat treatment in one or more stages. Here again hot air, superheated steam, constant temperature fluids and/or infra-red radiators are used as the heating medium. Heat-setting in the presence of water or water vapour, furthermore, causes softening of the polyamide layers, and thus improved flexibility of the film, due to more rapid absorption of water by polyamides as a result of raising the temperature.

Winding up the biaxially stretched tubular film is preferably performed with slightly oscillating winding machines in order to prevent, by means of the sideways movement of the film, a build-up of bulky edges. In a particularly preferred method of production, furthermore, the film tube is continuously rotated about its longitudinal axis, so that inevitable thicker places in the film are not laid on top of each other and so-called "piston-rings" in the rolls are avoided. Advantageously the sum of all the layer thicknesses of the tubular film is between 35 $\mu$m and 75 $\mu$m, preferably between 45 $\mu$m and 65 $\mu$m.

The object of the invention is explained in more detail using the following examples.

EXAMPLES

The examples listed below were carried out on a 5-layer tubular film coextrusion line. Plasticising and homogenising the thermoplastic polymers took place using 3 to 5 separate extruders, depending on the number of polymer layers. Biaxial stretching of the coextruded primary tube was performed by the generally known "double bubble" process.

Assessment of the test sample productions specified below took place on the one hand by means of criteria which describe the production process (criteria A), and on the other hand by means of criteria which characterise the quality of the end product (criteria B).

Criteria (A) which have been included in Table 1, are:
Frequency of bursting of the stretching bubble during a test production of 6000 m of biaxially stretched tubular film.
Deviations in diameter of the stretched film bubble during the test production.
Criteria (B) which have been included in Table 2 are:
Streakiness of the pigment-containing tubular film
Permeability to water vapour of the film sample
Permeability to oxygen of the film sample.
In the following examples, the following abbreviations are used for the polymers used in the coextruded film layers:
A1: Copolyamide 6.66 (Ultramid C 35 from BASF)
A2: Polyamide 6 (Durethan B38 F from Bayer)
B1: A copolymer based on polypropylene with maleic anhydride groups grafted on (Admer QF 551 E from Mitsui; PO–AP=polyolefinic adhesion promoter)
B2: A copolymer based on LLD polyethylene with maleic anhydride groups grafted on (Bynel E 409 from Du Pont)

XX1: Ethylene/vinylalcohol copolymer (Eval EP-F 101 BZ from Kuraray).

[The number after the point, e.g. A2.2, refers to the numbering of the layers with the same basic polymer, e.g. 2nd layer made from Durethan 38 F, with the numbers running from inside to outside].

Example 1
[PA6.66/PA6.66 (20% Gold MB)/PO-AP/PA6.66]

From the coextrusion die emerges a 4-layered coextruded molten primary tube with the structure (from inside to outside):

A1.1/A1.2+Add./B1.1/A1.3 and it is cooled both from the outside and from the inside, using water kept at 10° C., and converted to the solid state.

Layer A1.2 contains, apart from the basic polymer Ultramid C 35, an additional 20% by wt. of a gold masterbatch (MB) based on polyamide.

Polymer layer B1.1, apart from an adhesion promoting function, also acts as a water-vapour barrier.

After cooling, the primary tube has a diameter of 16 mm and the following distribution of layer thicknesses (from inside to outside):

A1.1=100 $\mu$m/A1.2=160 $\mu$m/B1.1=80 $\mu$m/A1.3=100 $\mu$m.

Finally, the primary tube is re-heated in a current of air held at 125° C. and biaxially stretched by 3.2-fold in both the transverse and longitudinal directions by inserting a pressurised air bubble between two pairs of take-off rolls which are sealed in an air-tight manner.

The biaxially stretched film bubble is passed through a constant temperature heat treatment zone at 165° C., again between two pairs of air-tight rolls, wherein an internally introduced pressurised cushion largely prevents any thermally initiated reduction in diameter.

The film obtained in this way has a diameter of 50 mm and a total film thickness of 42 $\mu$m.

The comparative assessments with respect to the processing behaviour of the film tube during production and the characterising quality properties, in accordance with the mode of action given above, are given in Tables 1 and 2.

Comparison Example 1
[PA6.66 (12% gold MB)/PO-AP/PA6.66]

Using the same procedure as is described in example 1, a 3-layered coextruded primary tube with the structure (from inside to outside):

A1.1+Add./B1.1/A1.2 and distribution of layer thicknesses:

A1.1=260 $\mu$m/B1.1=80 $\mu$m/A1.2=100 $\mu$m is produced.

Layer A1.1 contains, apart from the basic polymer PA6.66, an additional 12% of gold masterbatch.

In contrast to example 1, the pigment-carrying layer is now on the internal face of the tube and the pigment concentration has been reduced from 20% by wt. to 12% by wt.

The primary tube is further processed under the same stretching and heat-fixing conditions as in example 1.

A summary of the comparative assessment is given in Tables 1 and 2.

Example 2
[PA6.66/PA6.66 (20% gold MB)/PO-AP/PA6.66 (20% gold MB)/PA6.66]

Using the same method as in example 1, a 5-layered coextruded primary tube is produced with the structure given below (from inside to outside):

A1.1/A1.2+Add./B1.1/A1.3+Add./A1.4

Layers A1.2 and A1.3, like example 1, again consist of a 6.66 copolyamide and contain 20% by wt. of a gold masterbatch based on Polyamide.

After cooling, the primary tube has a diameter of 16 mm and the following distribution of layer thicknesses:

A1.1=60 $\mu$m/A1.2=120 $\mu$m/B1.1=80 $\mu$m/A1.3=120 $\mu$m/A1.4=60 $\mu$m.

After re-heating the primary tube is stretched by 3.2-fold in both the transverse and longitudinal directions and then heat-fixed.

The final product has a diameter of 50 mm and a total thickness of 43 $\mu$m.

A summary of the comparative assessment is given in Tables 1 and 2.

Comparison Example 2
[PA6.66 (13% by wt. gold MB)/PO-AP/PA6.66 (13% by wt. gold MB)

A primary tube with the structure:

A1.1+Add./B1.1/A1.2+Add.

and distribution of layer thicknesses:

A1.1=180 $\mu$m/B1.1=80 $\mu$m/A1.2=180 $\mu$m is produced.

In contrast to example 2, the pigment-carrying layer is now on the internal and external faces of the film bubble and the pigment concentration in the pigment-carrying layers has been reduced from 20% by wt. to 13% by wt.

The primary tube is further processed under the same stretching and heat-fixing conditions as in examples 1 and 2.

A summary of the comparative assessment is given in Tables 1 and 2.

Example 3
[PA6/PA6 (50% COPO)/PO-AP/EVOH/PA6]

A 5-layered coextruded primary tube with the structure:

A2.1/A2.2+Add./B2.1/XX1.1/A2.3 is produced.

Layer A2.2 contains, apart from Durethan B 38 F, an additional 50% by wt. of a polyethylene copolymer (Surlyn 1650 from Du Pont) which is partially compatible with the polyamide.

After cooling the primary tube has a diameter of 14 mm and the following distribution of layer thicknesses:

A2.1=110 $\mu$m/A2.2=150 $\mu$m/B2.1=40 $\mu$m/XX1.1=40 $\mu$m/A2.3=80 $\mu$m

After re-heating, the primary tube is stretched by 3-fold in both the transverse and longitudinal directions and then heat-fixed.

The final product has a diameter of 42 mm and a total thickness of 47 $\mu$m.

A summary of the comparative assessment is given in Tables 1 and 2.

Comparison Example 3
[PA6 (25% COPO)/PO-AP/EVOH/PA6]
A primary tube with the structure:

A2.1+Add./B2.1/XX1.1/A2.2 and distribution of layer thicknesses:

A2.1=300 μm/B2.1=40 μm/XX1.1=40 μm/A2.2=80 μm is produced.

In contrast to example 3 according to the invention, the ethylene copolymer carrying layer is now on the internal face of the film bubble and the concentration in the carrier layer A2.1 has been reduced to 25% by wt.

The primary tube is further processed under the same stretching and heat-fixing conditions as in example 3.

A summary of the comparative assessment is given in Tables 1 and 2.

Example 4
[PA6/PA6.66(30% COPO+20% gold MB)/PO-AP/EVOH/PA6]

As in the previously described examples, a 5-layered coextruded primary tube is produced with the structure given below (from inside to outside):

A2.1/A1.1+Add./B2.1/XX1.1/A2.2

Apart from the basic polymers for the 4 layers, 30% by wt. of Surlyn 1650 and 20% by wt. of gold masterbatch were admixed with layer A1.1.

After cooling, the primary tube has a diameter of 15 mm and the following distribution of layer thicknesses:

A2.1=60 μm/A1.1=200 μm/B2.1=40 μm/XX1.1=30 μm/A2.2=100 μm

After re-heating, the primary tube is stretched by 3.2-fold in both the transverse and longitudinal directions and then heat-fixed.

The final product has a diameter of 47 mm and a total thickness of 42 μm.

A summary of the comparative assessment is given in Tables 1 and 2.

Example 5
[PA6/PA6.66 (30% COPO+20% gold MB)/PO-AP/PA6.66 (30% COPO+20% gold MB)/PA6]
A 5-layered coextruded primary tube with the structure:

A2.1/A1.1+Add./B1.1/A1.2+Add./A2.1 and distribution of layer thicknesses:

A2.1=60 μm/A1.1=140 μm/B1.1=40 μm/A1.2=140 μm/A2.1=60 μm is produced, biaxially stretched and heat-set.

Layers A1.1 and A1.2 contain, apart from the basic polymer PA6.66, an additional 30% by wt. of Surlyn 1650 and 20% by wt. of gold masterbatch.

A summary of the comparative assessment is given in Tables 1 and 2.

Comparison Example 5
[PA6.66 (20% COPO+10% gold MB)/B1.1/PA6.66 (20% COPO+10% gold MB)]
A 3-layered primary tube with the structure:

A1.1+Add./B1.1/A1.2+Add.

and distribution of layer thicknesses:

A1.1=200 μm/B1.1=40 μm/A1.2=200 μm is produced, biaxially stretched and heat-set.

Layers A1.1 and A1.2 contain, apart from the basic polymer PA6.66, an additional 20% by wt. of Surlyn 1650 and 10% by wt. of gold masterbatch.

In contrast to example 5 according to the invention, the polyamide layers which have been modified with pigment and ethylene copolymer, are on the internal face of the tubular film.

A summary of the comparative assessment is given in Tables 1 and 2.

TABLE 1 presents product-relevant assessment criteria obtained during the test productions.
I. Frequency at which the stretching bubble bursts during a test production run of 6000 m of biaxially stretched plastic tube.
II. Deviation in diameter of the stretching film bubble during the test production run.

| Example (E) or Comparison (C) number | Number of bursts (I). | Deviation in diameter (II) (mm) |
|---|---|---|
| E1 | 0 | ±0.4 |
| C1 | 3 | ±0.7 |
| E2 | 1 | ±0.5 |
| C2 | 3 | ±0.7 |
| E3 | 0 | ±0.6 |
| C3 | 2 | ±0.9 |
| E4 | 1 | ±0.6 |
| E5 | 1 | ±0.6 |
| C5 | 5 | ±1.0 |

TABLE II presents quality-relevant assessment criteria for the film samples:
I. Streakiness of the pigment-containing tube - visual assessment using the following scale of evaluation:
1 = no streaks visible
2 = streaks hardly visible
3 = streaks fairly obvious
4 = streaks clearly visible
II. Permeability to water vapour of the film sample [g/m² d] (at 23° C.; 85% rel. hum.]
III. Permeability to oxygen of the film sample [ml/m² bar d] (at 23° C.; 75% rel. hum.)

| Example (E) or Comparison (C) number | Streakiness (I) | Permeability to water (II) | Permeability to oxygen (III) |
|---|---|---|---|
| E1 | 1 | 5 | 30 |
| C1 | 4 | 5 | 36 |
| E2 | 0 | 0 | 34 |
| C2 | 3 | 0 | 40 |
| E3 | — | 3 | 4 |
| C3 | — | 5 | 4 |
| E4 | 1 | 8 | 3 |
| E5 | 0 | 3 | 35 |
| C5 | 2 | 4 | 40 |

We claim:
1. An at least 4-layered, coextruded, biaxially stretched tubular film for wrapping items which are packaged in a liquid or paste form and which are subjected to heat treatment after being packed, comprising internally and externally located layers, which consist essentially of aliphatic polyamide, at least a first intermediate layer with a water-blocking function enclosed by the internally and externally located polyamide layers, said first intermediate layer comprising polyethylene or polypropylene and/or copolymers based on ethylene and/or propylene, and at least one second intermediate layer directly bonded to at least one of the internally or externally located aliphatic polyamide layer, comprising an aliphatic polyamide filled with at least one inorganic additive in an amount that is more than zero % by weight and up to 50% by weight selected from the group consisting of titanium dioxide, carbon black, zinc iron yellow and iron oxide, and optionally at least one organic additive selected from the group consisting of a partially aromatic polyamide, ethylene/vinyl acetate copolymer, an ionomeric polymer, a maleic anhydride grafted polyethylene or polypropylene copolymer, polyethylene terephathalate, polybutylene terephthalate and a copolymer containing units of ethylene terephthalate or butylene terephthalate.

2. A film according to claim 1, wherein the aliphatic polyamide of said second intermediate layer consists essentially of at least one member selected from the group consisting of polyamide 6, polyamide 11, polyamide 12, polyamide 66, polyamide 6.66, polyamide 6.8, polyamide 6.9, polyamide 6.10, polyamide 6.11 and polyamide 6.12.

3. A film according to claim 1, including at least two such second intermediate layers, one being directly bonded to said internally located layer and one being directly bonded to said externally located layer.

4. A film according to claim 1, wherein said first intermediate layer comprises a maleic anhydride containing copolymer based on ethylene or propylene.

5. A film according to claim 4, wherein the maleic anhydride grafted polyethylene or polypropylene is admixed with a polymer of at least one of ethylene or propylene.

6. A film according to claim 1, wherein the internally and externally located polymer layers consist essentially of at least one member selected from the group consisting of polyamide 6, polyamide 11, polyamide 12, polyamide 66, polyamide 6.66, polyamide 6.8, polyamide 6.9, polyamide 6.10, polyamide 6.11 and polyamide 6.12.

7. A film according to claim 1, the film having a total thickness of 35 to 75 $\mu$m.

8. A film according to claim 1, wherein the aliphatic polyamide of said second intermediate layer consists essentially of at least one member selected from the group consisting of polyamide 6, polyamide 12, polyamide 66, polyamide 6.66, polyamide 6.8, polyamide 6.9, polyamide 6.10, polyamide 6.11 and polyamide 6.12, said first intermediate layer comprising a maleic anhydride grafted polyethylene or polypropylene admixed with a polymer of at least one of ethylene or propylene, and the internally and externally located polymer layers consist essentially of at least one member selected from the group consisting of polyamide 6, polyamide 11, polyamide 12, polyamide 66, polyamide 6.8, polyamide 6.9, polyamide 6.10, polyamide 6.11 and polyamide 6.12, the film having a total thickness of 45 to 65 $\mu$m.

* * * * *